United States Patent

Kobayashi et al.

[15] 3,668,664

[45] June 6, 1972

[54] MAGNETIC CORE MEMORY PLANE

[72] Inventors: Seihin Kobayashi; Michihiro Torii, both of Shizuoka, Japan

[73] Assignee: Fuji Denki Kagaku Kabushiki Kaisha, Tokyo, Japan

[22] Filed: Oct. 20, 1970

[21] Appl. No.: 82,465

[30] Foreign Application Priority Data

Oct. 27, 1969 Japan ................................44/102342

[52] U.S. Cl. ..................................340/174 MA, 340/174 M

[51] Int. Cl. .....................................G11c 5/04, G11c 11/06

[58] Field of Search...........................................340/174 M

[56] References Cited

UNITED STATES PATENTS

| | | | |
|---|---|---|---|
| 2,712,126 | 6/1955 | Rosenberg et al. | 340/174 M |
| 3,225,336 | 12/1965 | Foster | 340/174 M |
| 3,292,161 | 12/1966 | Broadbent | 340/174 R |

*Primary Examiner*—Stanley M. Urynowicz, Jr.
*Attorney*—Eliot S. Gerber

[57] ABSTRACT

A magnetic core memory plane is provided in which magnetic cores arranged in matrix are strung by a plurality of turns of drive windings. Each drive winding is (1) strung through the magnetic cores in an alignment, (2) turned back along an optically transparent plate superposed upon the cores, and (3) again strung through the same cores to form the plurality of turns of the winding. Both ends of each drive winding are connected to terminal plates provided at the top surface of a frame.

6 Claims, 8 Drawing Figures

SEIHIN KOBAYASHI
MICHIHIRO TORII
INVENTORS

BY Eliot S. Gerber
ATTORNEY

SEIHIN KOBAYASHI
MICHIHIRO TORII

INVENTORS

BY *[signature]*

ATTORNEY

MAGNETIC CORE MEMORY PLANE

This invention relates to magnetic memory planes to be employed in electronic computers and information processors, and more particularly to magnetic core memory planes in which each magnetic core is provided with drive windings made up of a plurality of turns.

Generally, in a magnetic core memory plane, a number of magnetic cores each having magnetic characteristics of a rectangular hysteresis loop are arranged in matrix. These magnetic cores are strung by X and Y drive windings to supply half-select currents in a coincident-current mode, a sense winding to read out information from a selected core, and an inhibit winding to write in the information. In order to reduce the required level of the drive currents, it is known that the magnetic cores should be threaded through their minute holes by a plurality of turns of X and Y drive windings.

But, many disadvantages have been encountered in the assembly of a magnetic core matrix strung by these windings to a frame, which disadvantages will be described with reference to the drawings, in which.

Figure 1:
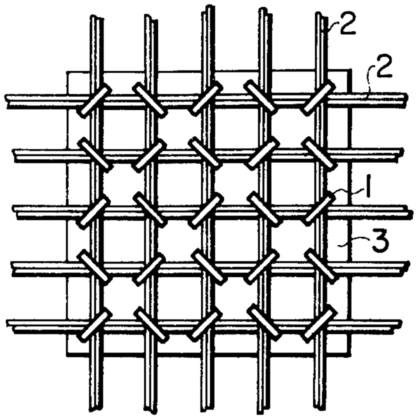
FIG. 1 PRIOR ART
FIG. 1 is a top plan view showing a conventional prior art magnetic core matrix in which drive windings are made up of two turns.
Figure 2:
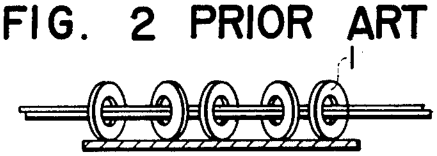
FIG. 2 PRIOR ART
FIG. 2 is a sectioned side view of the same matrix shown in FIG. 1.

In an example shown in FIGS. 1 and 2, magnetic cores 1 are arranged in matrix upon a plate 3, and two pairs of insulated parallel drive windings 2 are strung at right angles through the minute center hole of each core. To assemble the magnetic core matrix strung by these windings to a printed circuit frame 4, each drive winding is threaded through a hole 11 provided through the frame 4 and is connected to a terminal plate P1 at the bottom surface of the frame, thereby completing two turns of the windings.

Figure 4:
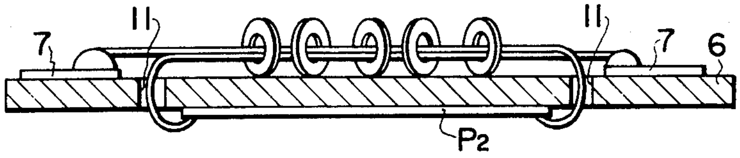
FIG. 4 PRIOR ART
FIG. 4 is a sectioned side view showing the conventional prior art magnetic core matrix assembled to another frame.

In another example shown in FIG. 4, each drive winding 2 is threaded through the hole 11 and connected to a metal foil P2 provided at the bottom surface of the frame, thereby completing two turns of the windings.

In these conventional magnetic core memory planes, although the stringing operation is easy because a pair of parallel drive windings 2 is simultaneously strung through the cores 1, the drive windings have to be threaded through the holes 11 (provided through the printed circuit frame 4 and 6) so that the drive windings 2 may be connected to the terminal plates P1 or the metal foil P2 at the bottom surface of the frames.

In addition, the number of connections of the drive windings to the terminal plates P1 or the metal foil P2 increases as the number of turns of the drive windings increases, so that it has taken a relatively long time to solder the drive windings to the terminal plates or the metal foil, which reduces confidence in the connections.

An object of the present invention is therefore to provide a magnetic core memory plane wherein a plurality of turns of each drive winding is made up of a single wire.

Another object is to eliminate the conventional troublesome operation of assembling a magnetic core matrix to a printed circuit frame in order to improve the reliability of the memory plane.

According to the present invention, a magnetic core memory plane comprises a frame, a number of annular magnetic cores arranged in matrix, an optically transparent plate placed in contact with said magnetic cores, and drive windings each made up of a plurality of turns on each core, said drive winding being turned back along the transparent plate to form said plurality of turns and connected at its both ends to terminal members. The terminal members are preferably provided on one surface of said frame.

Figure 5:
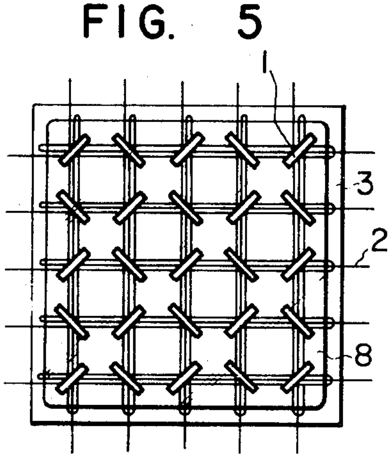
Figure 6:
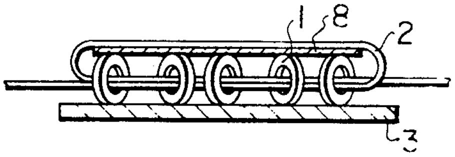
Figure 7:
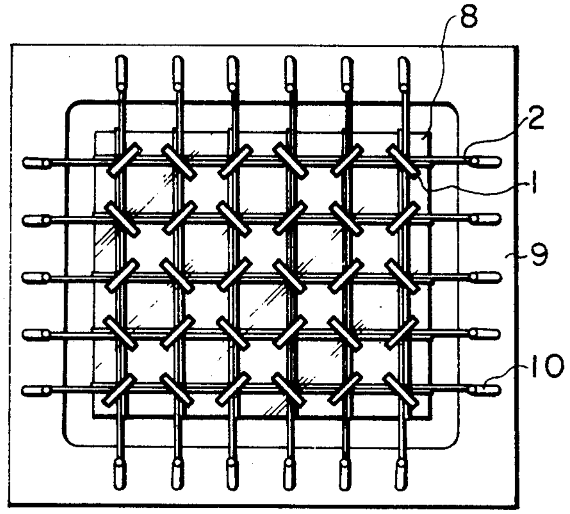
Figure 8:
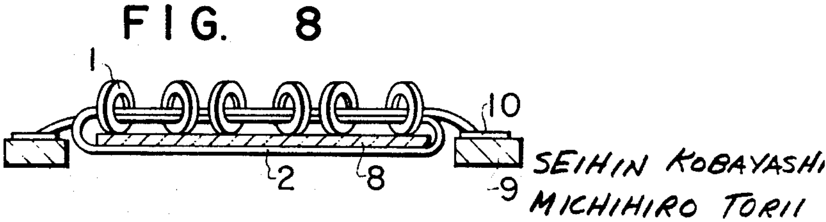

For a better understanding of the invention and to show how it may be carried into effect, embodiments thereof will now be described with reference to the accompanying drawings, in which:

FIG. 5 is a top plan view showing drive windings strung through magnetic core matrix in accordance with the present invention;

FIG. 6 is a sectioned side view of the same matrix shown in FIG. 5;

FIG. 7 is a top plan view showing a magnetic memory plane according to the present invention in which the magnetic core matrix shown in FIG. 5 is assembled to a frame;

FIG. 8 is a sectioned side view of the same as shown in FIG. 7.

Referring now to an embodiment of the present invention, firstly, annular magnetic cores 1 are temporarily fixed in a matrix upon a core arranging plate 3 as shown in FIGS. 5 and 6. Superimposed upon the magnetic cores, and in contact therewith, is an optically transparent thin plate 8 which is square-shaped and large enough to cover all the cores. Each drive winding 2 is strung through the cores 1 in an alignment from one side of the transparent plate to the opposite side thereof. The drive winding coming up to the other side of the transparent plate 8 is then turned back above the plate 8 to the starting side thereof, from which the drive winding is again strung through the same cores 1, thereby providing two turns of winding on the cores. In the same way, all the cores in the matrix are strung by two turns of the X and Y drive windings. After that, the magnetic core matrix is turned so that the transparent plate 8 is upside down and assembled to a printed circuit frame 9 as shown in FIG. 8. Both ends of each drive winding are connected to opposite terminal plates 10 on the top surface of the frame. The core arranging plate 3 is removed from the cores, thus providing a magnetic core memory plane according to the present invention.

The transparent plate 8 may be made of plastic since it is light and will not damage the insulative film of the drive windings. But, preferably, an electrical conductive transparent glass is used in place of the plastic plate.

Figure 3:
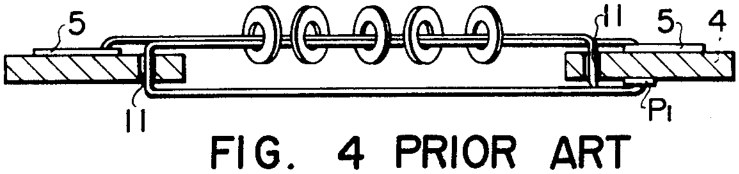
FIG. 3 PRIOR ART
FIG. 3 is a sectioned side view showing the conventional prior art magnetic core matrix assembled to a frame.

The magnetic core memory plane is so constructed that, irrespective of the number of turns of the drive windings, each of the drive windings is connected at its both ends to the two opposite terminal plates 10 at the top surface of the frame. Accordingly, the number of connections of each drive winding to the terminal plates 10 is reduced to two compared with the conventional magnetic core memory plane shown in FIGS. 3 and 4 which have four connections. In addition, the conventional operation of threading the drive windings through the minute holes 11 in the frame can be eliminated, whereby the time consumed to assemble the magnetic core matrix to the frame can be reduced up to about one-fifth to one-sixth compared with the conventional assembly procedure.

Furthermore, as the plate 8 superposed upon the magnetic cores is transparent, the operation for threading the drive windings through the magnetic cores can be performed without any obstruction.

When the conductive glass is employed as the transparent plate, the glass can be used as a ground plane, which serves to reduce impedance and to screen the electrostatic coupling due to other memory planes. Although the heat radiation efficiency of the glass is superior to that of plastics, it can be further elevated by applying thermoconductive resins or grease such as silicone grease between the conductive glass and the cores.

In addition, as the transparent plate thus connected to the cores serves also as an oscillation absorbing member, it prevents the magnetic cores from being damaged by mechanical oscillation. Therefore, the magnetic core memory plane according to the present invention provides, by far, better reliability than the conventional one.

Although the present invention has been described with reference to the preferred embodiments thereof, modifications may be made. For example, only X drive windings or Y drive windings may be made up of a plurality of turns. As another example, the transparent plate 8 which is placed below the cores, as shown in FIG. 8, may be placed above the cores and assembled to the frame 9.

In another modification, adjacent terminal plates 10 may be provided alternately at the top and bottom surfaces of the frame to narrow the spaces between the adjacent drive windings and, thereby, to increase the number of cores contained in the same frame. In this case, each drive winding made up of a plurality of turns is, of course, connected to its associated terminal plates at both ends thereof.

We claim:

1. A magnetic core memory plane comprising a frame, a number of annular magnetic cores arranged in a matrix, a transparent plate having first and second faces and placed above or below said magnetic cores, said transparent plate having its first face in supporting contact with said cores, and X and Y drive windings threaded through said cores, at least each of said X and Y drive windings being turned back along said transparent plate to lie against the second face of said plate, said windings forming a plurality of turns through said cores and connected at their both ends to terminal members on said frame.

2. A magnetic core memory plane as claimed in claim 1, wherein said terminal members are provided on one surface of said frame.

3. A magnetic core memory plane as claimed in claim 1, wherein said transparent plate is plastic.

4. A magnetic core memory plane as claimed in claim 1, wherein said transparent plate is a conductive glass, which serves as a ground plane.

5. A magnetic core memory plane as claimed in claim 4, wherein a heat conductive resin is applied between the magnetic cores and the conductive glass.

6. A magnetic core memory plane as claimed in claim 4, wherein a grease is applied between the magnetic cores and the conductive glass.

* * * * *